United States Patent [19]
Brette

[11] 3,729,668
[45] Apr. 24, 1973

[54] APARATUS FOR CONTROLLING THE DISPLACEMENT OF AN OBJECT BETWEEN ANY TWO POINTS

[75] Inventor: Yves-Jean Francois Brette, Sevres, France

[73] Assignee: Societe Industrielle Honeywell Bull (Societe Anonyme), Paris, France

[22] Filed: June 24, 1971

[21] Appl. No.: 156,261

[30] Foreign Application Priority Data

June 26, 1970 France.................................7023798

[52] U.S. Cl. ...................318/561, 318/617, 318/681
[51] Int. Cl............................................G05b 13/00
[58] Field of Search......................318/617, 681, 561

[56] References Cited

UNITED STATES PATENTS

| 3,241,015 | 3/1966 | Allen | 318/617 X |
| 3,525,883 | 8/1970 | Iordanidis | 318/681 X |
| 3,114,869 | 12/1963 | Goodwin | 318/617 |
| 3,015,767 | 1/1962 | Taylor | 318/617 |

Primary Examiner—Benjamin Dobeck
Attorney—Ronald T. Reiling et al.

[57] ABSTRACT

Apparatus for displacing an object between any two points along a predetermined path, according to a given law of motion, wherein a signal representing the actual speed of said object is compared with a reference speed signal derived according to the law of motion, and from said comparison an error signal is generated to control the speed of a motor driving such object.

8 Claims, 5 Drawing Figures

APARATUS FOR CONTROLLING THE DISPLACEMENT OF AN OBJECT BETWEEN ANY TWO POINTS

BACKGROUND OF THE INVENTION

The present invention relates to apparatus providing for displacing an object along a path according to a predetermined law of data motion.

Apparatus of this type is utilized in data processing systems to bring read-write heads to a desired track of a magnetic disc which is adapted for storing data.

It is important, in such apparatus, that the object to be displaced be brought in a minimum time from a starting point to a destination point, that during a first portion of the movement the values of acceleration and deceleration be close to the maximum permissible values without exceeding them, and that at the end of the movement, before reaching the destination point, the object assumes a low speed from which it will be braked so as to stop at the destination point.

It is necessary, further, that this mode of operation be achieved despite anticipated variations of the parameters entering into the equation of motion of the movable member.

Apparatus of this type comprising a linear direct current motor is known in the art. However, such apparatus demonstrates disadvantages, particularly it lacks stability in operation, the object displaced does not follow the desired law of motion, and such object vibrates at the end of its displacement due to the strong deceleration to which it is subject during the braking.

It is the object of the present invention to remedy these disadvantages.

SUMMARY OF THE INVENTION

According to the instant invention the apparatus providing for displacing an object between any two points of a given path according to a predetermined law of motion, wherein such apparatus is provided with a direct current motor, comprises means for applying to the motor a supply voltage of which the value is determined at each moment during at least one portion of the movement by a comparison between the actual speed of the object and a desired reference speed which the object must have at the position reached thereby at the moment considered. This reference speed is a function of the position of the object in accordance with the above mentioned law of motion.

For this purpose, the apparatus of the invention comprises:

a first generator for generating a signal representing the position reached by the object, a second generator for generating a signal representing the actual speed of the object, a function generator controlled by the signal generated by the first generator for generating a signal representing the reference speed, a comparator for producing an error signal resulting from comparing the signal representing the actual speed of the object, generated by the first generator, with the signal representing the reference speed, generated by the function generator, and control means providing for controlling the supply voltage of the motor as a function of the value of the error signal, and particularly for controlling the polarity of this supply voltage according to the polarity of the error signal.

In one embodiment of the invention, the signal representing the reference speed is a linear function of the distance remaining to be traveled by the object.

In order to provide for displacing the object both forward and backward, the apparatus comprises means disposed between the function generator and the comparator and adapted to change, as appropriate, the polarity of the signal delivered by the function generator.

BRIEF DESCRIPTION OF THE DRAWING

The invention will be described with reference to the accompanying drawing, wherein.

DESCRIPTION OF THE PREFERRED EMBODIMENT

Figure 1:
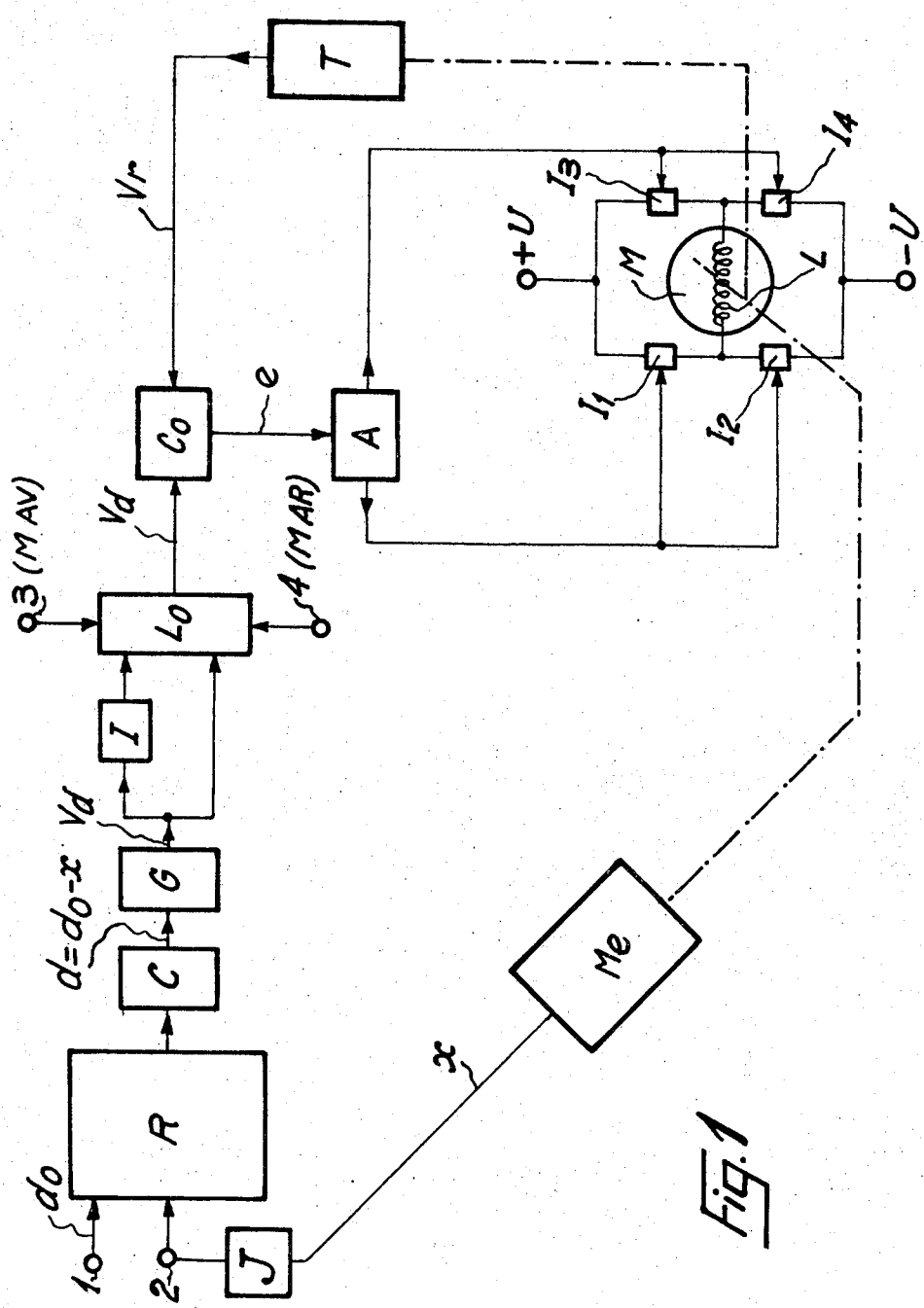
FIG. 1 is a schematic block diagram of apparatus in accordance with the invention.

The apparatus of the invention shown in FIG. 1 comprises a direct current motor M, adapted to advance by any means, not shown, an object, also not shown, for example read-write heads over a magnetic disc of a disc store. Motor M may be a linear direct current motor of the type termed "voice coil," which comprises a movable winding L that moves linearly when it is energized. The latter is connected in one diagonal of a bridge of switches I1–I4, for example transistors. The other diagonal of this bridge is connected to the terminals +U and −U of a source of direct voltage. The object to be displaced is moved in one direction when switches I1 and I4 are conductive, while switches I2 and I3 are open, and in the other direction when switches I2 and I3 are conductive, while switches I1 and I4 are open.

The apparatus of the invention further comprises a digital register R continuously delivering at its output terminal a digital signal representing the distance d remaining to be traveled by the object to reach its destination point (distance from destination register). Register R comprises an input terminal 1 providing a representation of the initial distance $d_o$ which separates the object from the destination point and an input terminal 2 on which is received a signal representing the distance $x$ traveled by the object. This $x$ signal is furnished by a measuring device Me, coupled mechanically to the movable member of motor M. Register R functions as a distance reducer, subtracting from the value $d_o$ the actual distance $x$ traveled. At each instant register R supplies the value corresponding to $d = d_o - x$. The digital output signal of register R is converted to analog form by a digital-analog converter C and controlled, in turn, a function generator G which delivers an electrical output signal corresponding to each value of $d$, such output signal representing a predetermined theoretical value $V_d$ of the velocity of the object. This value $V_d$ becomes constant, equal to the low velocity $V_b$ when the distance $d$ becomes less than a given value; i.e., when the object is in the vicinity of its destination point. The relationship $V_d = f(d)$ between $V_d$ and d may be linear. Function generator G may be of any known type, for example, it may consist of a network of resistors.

The output terminal of generator G is connected to a logical element Lo, both directly and through an inverter I. Logical element Lo is controlled from two terminals 3 and 4. Thus, logical element Lo receives both the signal $V_d$ and the signal $-V_d$ but delivers at its output terminal only one of such signals, as a function of the commands received on terminals 3 and 4. Terminals 3 and 4 enable the selection of either a forward movement (MAV) or a backward movement (MAR) for the object.

The output signal of logical element Lo has a value corresponding to a desired speed for the object and a polarity corresponding to the required direction of displacement of the object. This output signal of logical element Lo is compared by a comparator Co with an electrical signal $Vr$, of which the amplitude and polarity respectively represent the actual speed and direction of displacement of the object. The signal $Vr$ is furnished by any appropriate device T, which may be a tachometer coupled mechanically to the moveable member of motor M.

The speed error signal $e$ delivered by comparator Co (algebraic difference between the signals $V_d$ and $Vr$) is delivered to the input terminal of an amplifier A. According to the polarity of error signal $e$, amplifier A simultaneously controls either switches I1 and I4 or switches I2 and I3.

For explaining the operation of this apparatus, it will be assumed, the direction of displacement of the object having been chosen, that the function $V_d = f(d)$ is linearly decreasing from a value $f_0(d)$ for the distance $d_0$ to travel, at time $t_0$, to the value $f_2(d) = Vb$ for the distance $d_2$ remaining to travel, at time $t_2$ (see FIG. 4) Consequently, $V_d$ is an exponential decreasing function $g(t)$ of time $t$ (see FIG. 3) from the value $g_o(t)$ at time $t_0$, to the value $g_2(t) = Vb$, at time $t_2$. In accordance with the invention, the function $V_d = f(d)$ is chosen in the following manner.

Figure 2:
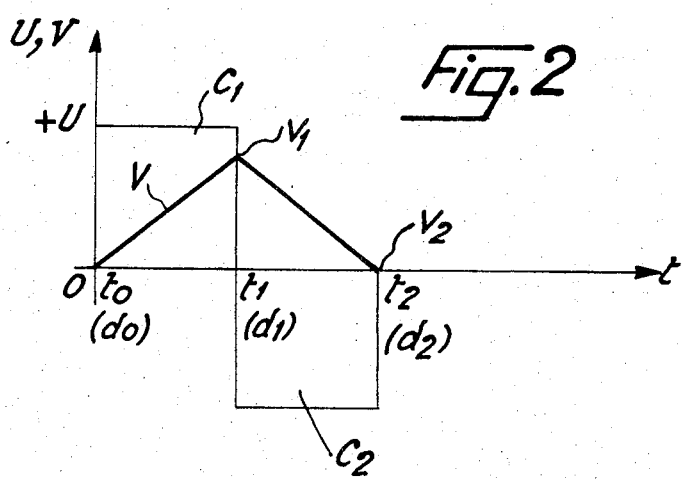
FIGS. 2, 3, 4 and 5 illustrate curves demonstrating the operation of the apparatus of FIG. 1.

If the control apparatus of the invention were non existent; i.e., if motor M operated with no load and if moveable winding L of motor M was supplied with square voltage pulses C1 and C2 of opposite polarities (the first for acceleration and the second for breaking), the speed V of the movable member of the motor will have the following behavior (see FIG. 2). During the duration $t_1-t_0$ of the first $2^2$ pulse C1, the speed increases from 0 (for $t_0$ and $d_0$) to a value V1 (for $t1$ and $d1$) along an exponential increasing curve 0–V1, which may be very close to a straight line for a suitable choice of the time constant of the circuit. Conversely during the duration $t_2-t_1$ of the second square pulse C2, the speed decreases from $V_1$ (for $t_1$ and $d_1$) to $V_2 = 0$ (for $t_2$ and $d_2$) along an exponential decreasing curve V1–V2, which can also be close to a straight line.

Thus, in the no load response to a supply of inverse square pulses, the speed taken by the moveable member of motor M has the behavior of a triangle 0–V1–V2, which is isosceles, if a favorable choice is made for $t_0 t_1 = t_1 t_2$, the amplitude of the square pulses being equal.

Figure 4:
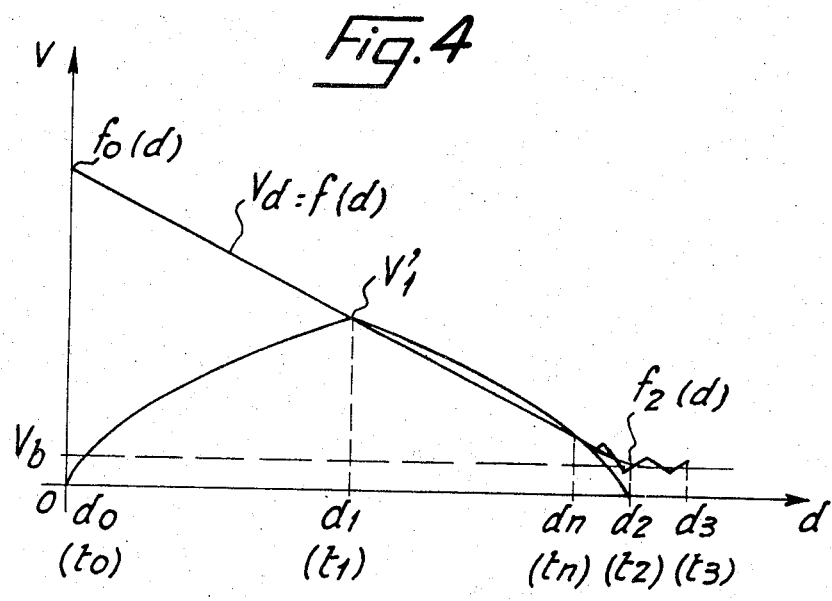
Figure 5:
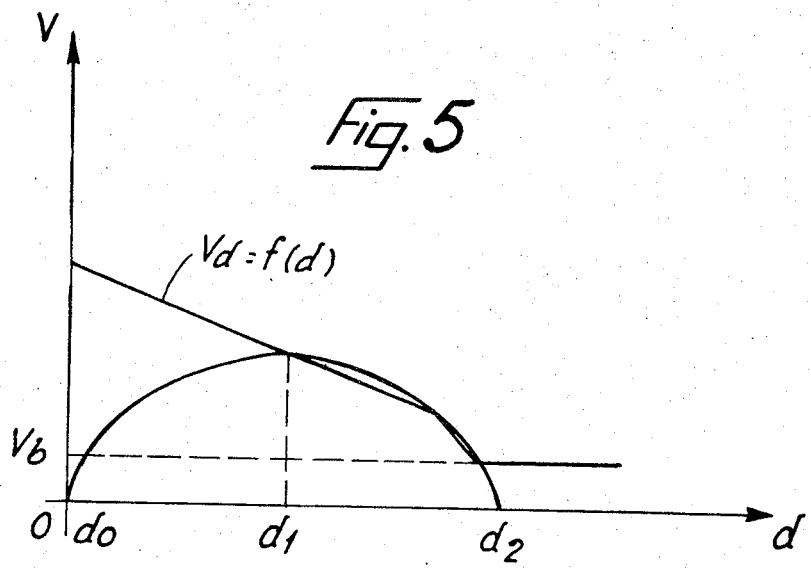

If, as shown in FIG. 4, this no load velocity is represented as a function of the distance remaining to travel, the linear portions 0–V1 and V1–V2 are transformed into two portions 0–V'1 and V'1–V'2, which are equal parabolas having their vertices at $d_0$ and $d_2$ and the axis $0d$ as an axis of symmetry these two portions intersect at V'1 (for $d_1$ and $t_1$) therefore the function $V_d = f(d)$, to be generated by function generator G, is selected in a manner to be an approximation of at least a part of the portion of parabola V'1–V'2, which is very different from the parabola portion 0V'1. For this purpose, the above mentioned straight line $f_0(d) - f_2(d)$ can be selected it is apparent that a more complicated function $Vd = f(d)$ can be chosen, particularly a broken line enveloping the portion of parabola V'1–V'2 (FIG. 5) in a manner to enable operation of the motor as long as possible in a manner approaching at the no load condition.

For $d_2$ and $t_2$ $Vd$ takes the value of the constant speed $V_b$ to which it is desired to reach.

These may be obtained in various ways; i.e., by utilizing a function generator G capable of delivering at its output terminal a signal to which a value $V_d = V_b$ corresponds to any value of d less than $d_2$. The same result may also be obtained by utilizing a register R which decrements to a residual data value such that the function generator G, controlled by the corresponding output signal furnished by converter C, delivers at its output terminal a signal representing the velocity $V_b$.

Figure 3:
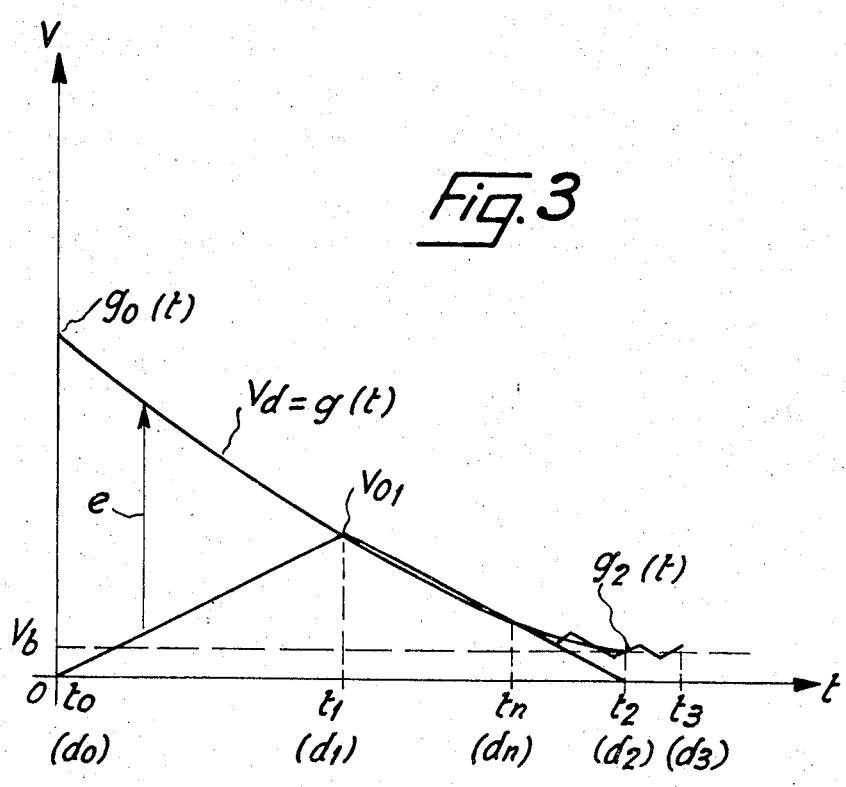

Referring now to FIG. 3, the straight line $V_d = F(d)$ is transformed to an exponential decreasing function $g_0(t) g_2(t)$, joining at $g_2(t)$ the constant velocity $V_b$.

Thus if a representation of the distance $d_0$ to travel is applied to input terminal $d$ of register R, $Vd$ is initially large, where as $Vr$ is small and therefore, the error voltage $e$ is positive as d decreases (or t increases), $Vd$ decreases and $Vr$ increases, so that $e$ decreases but remains positive. The speed $Vr$ of the movable member increases therefore according to the curve $0-V_01$ of FIG. 3. At time T1, the curve $0-V_01$ meets the curve $Vd = g(t)$ at $t$ $V_01$, and therefore the polarity of the error voltage $e$ reverses consequently, the switches which had been conducting open, whereas those which had been open close. The voltage at the terminals of movable winding L is reversed and produces braking of the moveable member. The speed $Vr$ thereupon decreases. At time $T_r$, between $t_1$ and $t_2$, $Vr$ becomes $mV_d$. The error voltage $e$ reverses again, which determines a new reversal of the voltage at the terminals of winding L. Thus, as a consequence of the succesive reversal of the voltage of the terminals of winding L, the speed $V_r$ of the moveable member takes on values alternatively greater less than the reference speed $Vb$ and reaches a value approximately $G_2(t)$ at time $t2$. At this moment the value of the signal $Vd$ imposes the velocity $Vb$ on the moveable member.

FIG. 4 similarly represents the variations of the speed of the moveable member of the function of distance $d$.

If the law $Vd = f(d)$ is selected so that, on the one hand, it corresponds to a law of deceleration as an optimum function of time and on the other hand, it is an approximation of the law of speed as a function of time corresponding to the most unfavorable conditions of operation (minimum supply voltage, maximum friction), in other conditions of operation the device operates in a manner to impose this law of speed on the moveable member, thereby providing the benefits of the law of deceleration with the same performances as under the most unfavorable conditions.

Electronic switches are most favored for utilization as switches I1, I2, I3, and I4. These can be made to operate in the linear region in a manner to vary linearly the voltage at the terminals of the moveable winding as a function of the error voltage $e$, at least for small values of this error voltage.

The apparatus of the invention provides therefore for assuring that the moveable member, after a rapid displacement in accordance with a given law of movement, reaches a desired speed $V_b$ at any moment $t_3$ greater than $t_2$, or, which is similar, for any distance $d_3$ remaining to travel which is less than $d_2$.

The apparatus of the invention may similarly be utilized for displacing magnetic heads at a constant speed over a given distance, for example in the course of operations which consist of displacing magnetic heads from their rest position outside the disk to the operating position above the disk tracks, and the reverse.

This movement at constant velocity is obtained by applying a fixed signal to the input terminal of register R and by suppressing the decrementing operation in register R during the movement of the heads; for example, by suppressing by means of a switch J the connection between the measuring device M$e$ and input terminal 2 of register R.

Various embodiments of the invention may be realized; by, the combination of a digital-decrementer and digital-analog converter may be replaced by a linear potentiometer driven by the movement of the moveable member.

I claim:

1. Apparatus for controlling the displacement of an object between any two points wherein a direct current motor is provided comprising:
    a first generator means for generating a first signal representative of the distance remaining to be traveled by said object, said first generator means comprising:
    means for receiving a signal representative of the distance which said object must travel between said two points,
    means for measuring the current position of said object and for providing a signal representative of the current position,
    a distance reducer means for reducing the signal representative of the distance which said object must travel by the amount of distance traveled by said object, said distance reducer means comprising a digital register followed by a digital to analog converter;
    a second generator means for generating a second signal representative of the actual speed of said object;
    a function generator, controlled by the first signal representative of the distance remaining to be traveled by said object, for generating a reference speed signal;
    means for comparing the second signal representative of the actual speed of said object with the reference signal and for generating an error signal indicative of the signal difference; and
    control means for controlling the polarity of the supply voltage to said direct current motor in accordance with the polarity of said error signal.

2. The apparatus of claim 1 wherein said distance reducer further comprises means for storing a minimum distance remaining to be traveled by said object so that the representation of the distance remaining to be traveled by said object is reduced until it reaches the minimum distance remaining to be traveled by said object.

3. The apparatus of claim 1 wherein said first generator means comprises:
    means for surpassing the signal representative of the current position.

4. The apparatus of claim 1 further comprising:
    an inverter means, interposed between said function generator and said comparing means for inverting the signal from said function generator.

5. The apparatus of claim 2 wherein the signal generated by said function generator is a straight line segment when said distance reducer means is reducing the distance remaining to be traveled by said object to said minimum distance remaining to be traveled by said object.

6. The apparatus of claim 5 wherein the signal generated by said function generator is a broken line when said distance reducer means has reduced the distance to be traveled by said object to the minimum distance remaining to be traveled by said object.

7. The apparatus of claim 1, wherein the signal generated by said function generator is a linear function of the distance remaining to be traveled by said objects.

8. The apparatus of claim 1, wherein said direct current motor is of the type comprising a linearly moving winding, said winding being mounted in a bridge of switches controlled simultaneously across a diagonal by the signal resulting from the comparison between the actual speed signal and the reference speed signal.

* * * * *